United States Patent
Otsuka et al.

(10) Patent No.: US 12,064,746 B2
(45) Date of Patent: Aug. 20, 2024

(54) MERCURY ADSORBENT AND METHOD FOR PRODUCING SAME

(71) Applicant: KURARAY CO., LTD., Kurashiki (JP)

(72) Inventors: Kiyoto Otsuka, Bizen (JP); Shuichi Ishida, Bizen (JP); Hideharu Iwasaki, Osaka (JP)

(73) Assignee: KURARAY CO., LTD., Kurashiki (JP)

( * ) Notice: Subject to any disclaimer, the term of this patent is extended or adjusted under 35 U.S.C. 154(b) by 148 days.

(21) Appl. No.: 17/945,195

(22) Filed: Sep. 15, 2022

(65) Prior Publication Data
US 2023/0026065 A1  Jan. 26, 2023

Related U.S. Application Data

(63) Continuation of application No. PCT/JP2021/005481, filed on Feb. 15, 2021.

(30) Foreign Application Priority Data

Mar. 17, 2020 (JP) ................................. 2020-046208

(51) Int. Cl.
*B01J 20/02* (2006.01)
*B01J 20/20* (2006.01)
*B01J 20/28* (2006.01)
*B01J 20/32* (2006.01)
*C10G 17/095* (2006.01)
*C10G 25/00* (2006.01)

(52) U.S. Cl.
CPC .......... *B01J 20/20* (2013.01); *B01J 20/0288* (2013.01); *B01J 20/0292* (2013.01); *B01J 20/28064* (2013.01); *B01J 20/28066* (2013.01); *B01J 20/28076* (2013.01); *B01J 20/2808* (2013.01); *B01J 20/3204* (2013.01); *B01J 20/3234* (2013.01); *C10G 17/095* (2013.01); *C10G 25/003* (2013.01); *C10G 2300/1044* (2013.01); *C10G 2300/205* (2013.01)

(58) Field of Classification Search
CPC .... B01J 20/20; B01J 20/0288; B01J 20/0292; B01J 20/28064; B01J 20/28066; B01J 20/28076; B01J 20/2808; B01J 20/3204; B01J 20/3234; B01J 20/28011; B01J 20/28069; B01J 20/3246; C10G 17/095; C10G 25/003; C10G 2300/1044; C10G 2300/205; C01P 2006/12; C01P 2006/14; C01P 2006/16; C01P 2006/90; C01B 32/372
See application file for complete search history.

(56) References Cited

U.S. PATENT DOCUMENTS

| | | | |
|---|---|---|---|
| 5,736,053 A | 4/1998 | Ikushima et al. | |
| 5,891,324 A * | 4/1999 | Ohtsuka | C01B 32/336 |
| | | | 208/299 |
| 2013/0157845 A1 | 6/2013 | Nalepa et al. | |

FOREIGN PATENT DOCUMENTS

| | | | |
|---|---|---|---|
| EP | 810278 A2 * | 12/1997 | ........... C10G 25/003 |
| JP | S63-247639 A | 10/1988 | |
| JP | H09-040971 A | 2/1997 | |
| JP | H09-239265 A | 9/1997 | |
| JP | H10-202003 A | 8/1998 | |
| JP | 3537581 B2 | 6/2004 | |
| JP | 2011143359 A | 7/2011 | |
| JP | 2013539413 A | 10/2013 | |
| WO | WO-2012030560 A1 | 3/2012 | |

OTHER PUBLICATIONS

Gullet et al., The Effect of activated carbon surface moisture on low temperature mercury adsorption, 2002, Carbon, 40, 65-72 (Year 2002).*
Jin Ying LUO, et al. "Experimental Study on Modified Activated Carbons for Elemental Mercury Adsorption", Proceedings of the CSEE, vol. 29, No. 35, Dec. 15, 2009, pp. 77-82 (with English abstract).
Y.H. Li, et al. "The effect of activated carbon surface moisture on low temperature mercury adsorption", Carbon, published Dec. 31, 2002, pp. 65-72.
English translation of the International Preliminary Report on Patentability and Written Opinion mailed Sep. 29, 2022 in PCT/JP2021/005481, 6 pages.
International Search Report issued Apr. 13, 2021 in PCT/JP2021/005481, 2 pages.
Extended European Search Report issued Apr. 29, 2024 in corresponding to European Patent Application No. 21771342.9, 9 pages.
Neda Asasian Kolur: "Investigation of sulfuric acid-treated activated carbon properties", Turkish Journal of Chemistry, vol. 43, No. 2, Apr. 3, 2019 (Apr. 3, 2019), pp. 663-675, XP093153279, ISSN: 1303-6130, DOI: 10.3906/kim-1810-63.

(Continued)

*Primary Examiner* — Randy Boyer
*Assistant Examiner* — Juan C Valencia
(74) *Attorney, Agent, or Firm* — Element IP, PLC

(57) ABSTRACT

Provided is a mercury adsorbent that can efficiently adsorb and remove mercury and/or a mercury compound contained in a liquid hydrocarbon and can suppress corrosive action even when used for a long time. The mercury adsorbent comprises an activated carbon including a mineral acid supported thereon, the activated carbon having a specific surface area of 1000 m$^2$/g or larger and a volume of micropores of 80 cm$^3$/g or larger, each of the micropores having a pore radius of 8 Å or smaller, and the mercury adsorbent has a moisture content of from 0.1 to 3 wt %.

7 Claims, No Drawings

(56) References Cited

OTHER PUBLICATIONS

Pejman Hadi: "Aqueous mercury adsorption by activated carbons", Water Research, vol. 73, Apr. 1, 2015 (Apr. 1, 2015), pp. 37-55, XP093153284, Amsterdam, NL ISSN: 0043-1354, DOI: 10.1016/j.watres.2015.01.018.

* cited by examiner

MERCURY ADSORBENT AND METHOD FOR PRODUCING SAME

CROSS REFERENCE TO THE RELATED APPLICATION

This application is a continuation application, under 35 U.S.C. § 111(a) of international application No. PCT/JP2021/005481, filed Feb. 15, 2021, which claims priority to Japanese patent application No. 2020-046208, filed Mar. 17, 2020, the entire disclosures of all of which are herein incorporated by reference as a part of this application.

FIELD OF THE INVENTION

The present invention relates to a mercury adsorbent used for adsorbing mercury and/or a mercury compound present in a liquid hydrocarbon as well as to a method for producing the same.

BACKGROUND OF THE INVENTION

Conventionally, palladium-supported alumina catalysts or the like are used in reforming of a liquid hydrocarbon such as naphtha via hydrogenation or the like. Upon this reforming, mercury or a mercury compound present as impurities in the liquid hydrocarbon cause catalyst poisoning and thus inhibit the hydrogenation reaction. In addition, due to the nature of mercury which easily forms amalgam with many kinds of metals, if an aluminum-based alloy, for example, is used in a liquid-hydrocarbon treatment equipment, mercury could form amalgam and possibly induce corrosion of the treatment equipment. For these reasons, there is a demand to remove mercury as well as a mercury compound contained in a liquid hydrocarbon.

One method for removing mercury and a mercury compound is to use a porous adsorbent such as an activated carbon, zeolite, and alumina to remove inorganic mercury from a liquid hydrocarbon by physical adsorption. This method, however, has problems of low mercury removal rate and extremely low adsorption performance when the mercury concentration is 10 ppb or lower. Sulfur-supported porous adsorbents as mercury adsorbents have been conventionally recognized. Such adsorbents are known to remove mercury by a reaction between mercury and sulfur. In the past, it was common, as methods for a porous material such as an activated carbon to carry sulfur thereon, that elemental sulfur or an organic sulfur compound such as thiophene was carried thereon. However, a liquid hydrocarbon is often processed in hydrogenation process as a petroleum product intermediate, and presence of sulfur and/or an organic sulfur compound is undesirable in that they cause poisoning of a hydrogenation catalyst and thus must be removed.

In view of these problems, a mercury adsorbent in which an acid is supported on a porous adsorbent has been recognized. For example, Patent Document 1 (JP Patent No. 3537581) discloses an adsorbent for a mercury compound in a liquid hydrocarbon, the adsorbent including an activated carbon carrying acid and having a volume of micropores of 80 ml/g or larger, each of the micropores having a pore radius of 8 Å or smaller.

SUMMARY OF THE INVENTION

Problems to be Solved by the Invention

Patent Document 1, however, is silent on release of the acid component into a gas phase, although the document describes that the acid component is characterized in that it is barely released into the liquid hydrocarbon. In the case where a mercury adsorbent is used for a long term, if the acid component is released into the gas phase, corrosion resistance of treatment equipment must be considered.

Therefore, an object of the present invention is to provide a mercury adsorbent that can efficiently adsorb and remove mercury and/or a mercury compound contained in a liquid hydrocarbon such as naphtha in a trace amount while the mercury adsorbent can have a reduced corrosive action even when used for a long time.

Means for Solving the Problems

As a result of intensive studies conducted by the inventors of the present invention to achieve the above-mentioned object, the inventors have unexpectedly found that moisture contained in a mineral acid-supported mercury adsorbent affects the corrosive action of the mercury adsorbent in a gas phase. As a result of further research, the inventors have found that by carrying a mineral acid on an activated carbon having a predefined specific surface area and a predefined pore distribution and adjusting a moisture content within a predefined range, mercury and/or a mercury compound in a liquid hydrocarbon can be efficiently adsorbed and removed, and corrosive characteristics of the mercury adsorbent affecting in the gas phase can be suppressed. The present inventors thus achieved the present invention.

That is, the present invention may include the following aspects.

Aspect 1

A mercury adsorbent for adsorbing mercury and/or a mercury compound in a liquid hydrocarbon, the mercury adsorbent comprising an activated carbon including a mineral acid supported thereon, the activated carbon having a specific surface area of 1000 m$^2$/g or larger (preferably from 1000 to 2500 m$^2$/g, more preferably from 1200 to 2000 m$^2$/g, further preferably from 1300 to 1700 m$^2$/g, and still more preferably from 1400 to 1600 m$^2$/g) and a volume of micropores of 80 cm$^3$/g or larger (preferably 90 cm$^3$/g or larger and more preferably 100 cm$^3$/g or larger), each of the micropores having a pore radius of 0.8 nm (8 Å) or smaller, and the mercury adsorbent having a moisture content of from 0.1 to 3% by weight (wt %) (preferably from 0.2 to 2.9 wt %, more preferably from 0.2 to 2.8 wt %, and further preferably from 0.3 to 2.5 wt %).

Aspect 2

The mercury adsorbent according to aspect 1, wherein the activated carbon contains oxygen and carbon in a weight ratio (O/C) of from 0.010 to 0.100 (preferably from 0.015 to 0.080, more preferably from 0.020 to 0.050, and further preferably from 0.030 to 0.045).

Aspect 3

The mercury adsorbent according to aspect 1 or 2, wherein when measured by combustion ion chromatography method, at least one ion selected from the group consisting of chloride ions, bromide ions, phosphate ions, phosphite ions, sulfate ions, and sulfite ions is detected in an amount of from 1000 to 5000 ppm (preferably from 1200 to 4000 ppm, more preferably from 1500 to 3500 ppm, further preferably from 2300 to 3500 ppm).

Aspect 4

The mercury adsorbent according to any one of aspects 1 to 3, wherein the mineral acid is at least one acid selected from the group consisting of hydrochloric acid, sulfuric acid, and phosphoric acid.

Aspect 5

A method of producing the mercury adsorbent as recited in any one of aspects 1 to 4, the method at least comprising:
bringing a mineral acid solution into contact with an activated carbon having a specific surface area of 1000 $m^2/g$ or larger (preferably from 1000 to 2500 $m^2/g$, more preferably from 1200 to 2000 $m^2/g$, further preferably from 1300 to 1700 $m^2/g$, and still more preferably from 1400 to 1600 $m^2/g$) and a volume of micropores of 80 $cm^3/g$ or larger (preferably 90 $cm^3/g$ or larger and more preferably 100 $cm^3/g$ or larger), each of the micropores having a pore radius of 0.8 nm (8 Å) or smaller to obtain an acid-treated activated carbon; and
adjusting a moisture content of the acid-treated activated carbon within a range of from 0.1 to 3 wt % (preferably from 0.2 to 2.9 wt %, more preferably from 0.2 to 2.8 wt %, and further preferably from 0.3 to 2.5 wt %).

Aspect 6

The method according to aspect 5, wherein the activated carbon contains oxygen and carbon in a weight ratio (O/C) of from 0.010 to 0.100 (preferably from 0.015 to 0.080, more preferably from 0.020 to 0.050, and further preferably from 0.030 to 0.045).

Aspect 7

Use of the mercury adsorbent as recited in any one of aspects 1 to 4 for adsorbing mercury and/or a mercury compound by bringing the mercury adsorbent into contact with a liquid hydrocarbon containing the mercury and/or the mercury compound.

As used herein, the term "mercury and/or mercury compound" refers to any form of a substance including mercury atom present in a liquid hydrocarbon, such as a metallic mercury as an element, an inorganic mercury (such as ionic mercury), and an organic mercury. As used herein, the term "mercury adsorbent" means an adsorbent which adsorbs mercury and/or a mercury compound and has the same meaning as "mercury and/or mercury compound adsorbent."

The present invention encompasses any combination of at least two features disclosed in the claims and/or the specification and/or the drawings. In particular, any combination of two or more of the appended claims should be equally construed as included within the scope of the present invention.

Effects of the Invention

The mercury adsorbent according to the present invention can efficiently adsorb and remove mercury and/or a mercury compound in a liquid hydrocarbon and can have a reduced corrosive action even when used for a long time.

DESCRIPTION OF THE EMBODIMENTS

Mercury Adsorbent

A mercury adsorbent according to the present invention comprises an activated carbon including a mineral acid supported thereon. The activated carbon used as a carrier herein has a specific surface area of 1000 $m^2/g$ or larger. Use of a specific activated carbon having a large specific surface area is advantageous in supporting a mineral acid and makes it possible to retain a certain moisture content. The specific surface area of the activated carbon may be preferably from 1000 to 2500 $m^2/g$, more preferably from 1200 to 2000 $m^2/g$, further preferably from 1300 to 1700 $m^2/g$, and still more preferably from 1400 to 1600 $m^2/g$. The specific surface area of the activated carbon is measured by BET method as described in Examples below.

In terms of improving mercury adsorption performance, the activated carbon used in the present invention has a volume of pores of 80 $cm^3/g$ or larger, each of the pores having a pore radius of 8 Å or smaller. The volume of the pores each having a pore radius of 8 Å or smaller in the activated carbon may be preferably 90 $cm^3/g$ or larger and more preferably 100 $cm^3/g$ or larger. Although the volume of the pores each having a pore radius of 8 Å or smaller in the activated carbon does not have a specific upper limit, for example, the upper limit of the pore volume may be 200 $cm^3/g$ or smaller. In the present invention, the pore distribution and pore volume in the activated carbon can be calculated on the basis of a nitrogen adsorption isotherm at the liquid nitrogen temperature (77K), and specifically, be measured by the method as described in Examples below.

In terms of retaining a certain moisture content and improving mercury adsorption performance, the activated carbon used in the present invention may have a total pore volume of from 100 to 1000 $cm^3/g$, preferably from 150 to 800 $cm^3/g$, and more preferably from 200 to 500 $cm^3/g$.

The activated carbon used in the present invention may preferably contain oxygen and carbon in a weight ratio (O/C) of from 0.010 to 0.100. Oxygen contained in the activated carbon has advantageous functions of not only enhancing hydrophilicity of a carbon material which is essentially hydrophobic, but also holding a mineral acid component. The weight ratio of oxygen to carbon (O/C) in the activated carbon may be preferably from 0.015 to 0.080, more preferably from 0.020 to 0.050, and further preferably from 0.030 to 0.045. Where an activated carbon has a too high weight ratio O/C, it tends to have difficulty in industrial production due to deterioration in mechanical strength as a carrier. In addition, such an activated carbon tends to absorb more moisture, making it difficult to adjust the moisture content. Where an activated carbon has a too low weight ratio O/C, the activated carbon may not exhibit sufficient hydrophilicity, so that the activated carbon cannot retain a sufficient moisture content nor hold the mineral acid carried thereon, which possibly leads to corrosion of a treatment apparatus.

An oxygen content and a carbon content of the activated carbon (activated carbon before carrying the mineral acid) refer to an oxygen content and a carbon content measured in the activated carbon before carrying the mineral acid, respectively, by the method as described in Examples below. These content values are not different between before carrying and after carrying a mineral acid where the mineral acid does not contain oxygen or carbon (for example, hydrochloric acid). In contrast, where a mineral acid-supported activated carbon including a mineral acid containing oxygen and/or carbon is a measured target, an oxygen content and a carbon content of the activated carbon before carrying the mineral acid can be calculated utilizing separately measured contents of atoms other than oxygen and carbon atoms contained in the mineral acid (for example, nitrogen atom contained in nitric acid) or a content of the mineral acid itself, depending on the type of mineral acid. That is, the oxygen content and the carbon content of the activated carbon before carrying the mineral acid can be calculated by subtracting the oxygen content and the carbon content originating from the mineral acid from an oxygen content and a carbon content based on elemental analysis results in the activated carbon after carrying the mineral acid, respectively. For example, where the mineral acid is phosphoric acid or sulfuric acid, a phosphoric acid content or a sulfuric acid content can be separately quantified using an automated combustion/absorption device ("AQF-2100H" manufactured by Mitsubishi Chemical Analytech Co., Ltd.) and an ion chromatograph ("ICS-2100" manufactured by Thermo Fisher scientific), and then, an oxygen content originating from the phosphoric acid or the sulfuric acid can be subtracted from an oxygen content of the activated carbon after carrying the mineral acid based on the elemental analysis result to determine an oxygen content of the activated carbon before carrying the mineral acid.

The activated carbon used in the present invention may have an ash content (ignition residue) of from 0.1 to 5 wt %, preferably from 0.3 to 4 wt %, and more preferably from 0.5 to 3 wt %.

According to the present invention, as long as the mineral acid has a property to adsorb mercury and/or a mercury compound, the mineral acid to be supported on the activated carbon is not limited to a specific one and may be any of hydroacids such as hydrochloric acid and hydrobromic acid, and oxoacids such as sulfuric acid, sulfurous acid, nitric acid, phosphoric acid, phosphorus acid, and boric acid, which can be used alone or in combination of two or more. Preferable acids may include those which have high capacity to adsorb mercury and/or a mercury compound and have reduced desorbing property to leach into the liquid, as well as have little chemical reactivity when they are brought into contact with a liquid hydrocarbon. From these perspectives, it is preferable to use at least one acid selected from the group consisting of hydrochloric acid, sulfuric acid, and phosphoric acid, and it is more preferable to use hydrochloric acid. In the present specification, "mineral acid" may sometimes be simply referred to as "acid."

The mercury adsorbent according to the present invention has a moisture content of from 0.1 to 3 wt %. Although the mechanism of how the moisture contained in the mercury adsorbent works is uncertain, it is assumed that a certain amount of water contained in a specific activated carbon may form water film on the surface of the activated carbon and facilitates ionization of the mineral acid supported on the activated carbon. Ion species of the mineral acid incorporated in the water film react with inorganic mercury and/or organic mercury present in a liquid hydrocarbon to adsorb them. In the meantime, ion species of the mineral acid which is also firmly immobilized to the activated carbon with the water film can remain on the mercury adsorbent without leaching into the liquid hydrocarbon nor evaporating to be released outside. As a result, it is considered that the mercury adsorbent makes it possible not only to improve adsorption performance to adsorb mercury and/or a mercury compound, but also to suppress corrosion in equipment or the treatment facilities caused by mineral acid ions from the mercury adsorbent. The mercury adsorbent may have a moisture content of preferably from 0.2 to 2.9 wt %, more preferably from 0.2 to 2.8 wt %, and further preferably from 0.3 to 2.5 wt %. The moisture content of the mercury adsorbent indicates a proportion (wt %) of a weight of water contained in the mercury adsorbent to a total weight of the mercury adsorbent and, in particular, is measured by the method as described in Examples below.

The mercury adsorbent according to the present invention may have at least one ion selected from the group consisting of chloride ions, bromide ions, phosphate ions, phosphite ions, sulfate ions, and sulfite ions in a detected amount of from 1000 to 5000 ppm when measured by combustion ion chromatography method. The detected amount of the ions may be preferably from 1200 to 4000 ppm, more preferably 1500 to 3500 ppm, and still more preferably 2300 to 3500 ppm. A mercury adsorbent having a too low ion content tends to be less reactive to mercury and/or a mercury compound and thus have low adsorption performance. A mercury adsorbent having a too high ion content is not preferable since there is a possibility that it may cause reaction between mercury and the ions, leading to coagulated precipitation as an inorganic mercury compound in a liquid hydrocarbon, which is not immobilized to the carrier activated carbon.

The mercury adsorbent according to the present invention enables the mineral acid component firmly immobilized to the carbon surface in usual, so that ions originating from the added mineral acid are rarely detected even when the mercury adsorbent is dispersed in ion exchange water. Although its existence form is not certain, the mineral acid component is firmly immobilized to the ash of the carrier activated carbon by some interaction. On the other hand, the mineral acid component is considered not to form salts by the reaction with the ash because the mineral acid component is detected in an ionized form in combustion ion chromatography method as described above.

If the moisture content (preferably the moisture content and the ion contents measured by combustion ion chromatography method) of the mercury adsorbent according to the present invention falls within the above range, the mercury adsorbent does not cause metal corrosion at room temperature nor release ions from a surface layer thereof. Thus, such a mercury adsorbent is advantageously applicable for industrial use because it is unnecessary to concern about corrosion of storage facilities due to water intrusion into the mercury adsorbent.

Method of Producing Mercury Adsorbent

A method of producing the mercury adsorbent according to the present invention may at least comprise: bringing activated carbon having a specific surface area of 1000 $m^2/g$ or larger and a volume of micropores of 80 $cm^3/g$ or larger, each of the micropores having a pore radius of 8 Å or smaller, into contact with a mineral acid solution to obtain an acid-treated activated carbon; and adjusting a moisture content of the acid-treated activated carbon within a range of from 0.1 to 3 wt %.

As long as the activated carbon used as a carrier in the present invention has the specific surface area and the pore volume as described above, the production method of the activated carbon is not limited to a specific one. The activated carbon can be obtained via, for example, gas activation in which a carbonized material of a carbonaceous raw material which is a raw material of activated carbon is activated under water vapor or carbon dioxide at a high temperature; chemical activation in which a carbonized material of a carbonaceous raw material is activated by treatment with zinc chloride, phosphoric acid, concentrated sulfuric acid, etc.; and other activation.

As for the carbonaceous raw material, any well-known raw material of activated carbon may be used, such as plant-based raw materials including trunks, stems, leaves, and fruits of various plant materials (e.g., plant-based raw materials including plant-derived materials such as coconut shells, coffee beans, tea leaves, straws, rice husks, rice plants, wheat, sugarcane, corn, orange, banana, and wood; fern-, moss-, and algae-derived materials; processed plant materials such as cellulose, lignin, and lignocellulose); mineral-based raw materials including coal, coal pitch, and petroleum pitch; synthetic resin-based raw materials including phenol resins, acrylic resins, furan resins, and melamine resins. These carbonaceous raw materials may be used alone or in combination of two or more. From the viewpoint of the support for the mineral acid component, coconut shells or wood materials are preferably used.

Carbonization process for the carbonaceous raw material is not limited to a specific one. Carbonization may be performed, for example, by dry distillation at a temperature of from about 400 to 800° C. under an atmosphere of an inert gas such as nitrogen, helium, argon, and carbon monoxide, or a mixture of these inert gases, or a mixture containing these inert gases as main components and other gas(es).

Activation of the carbonized material of the carbonaceous raw material is preferably performed by gas activation under a gas at least containing water vapor from the viewpoint of economic advantages and of oxygen content control in the activated carbon surface layer. As the activation gas, carbon dioxide, nitrogen, oxygen, or the like can be used besides water vapor. For example, activation may be performed with an activation gas containing water vapor and carbon dioxide. The activation gas may have a water vapor content of 40% by volume (vol %) or lower, preferably 35 vol % or lower, and more preferably 30 vol % or lower. The lower limit of the water vapor content of the activation gas is not limited to a specific value and may be, for example, at least 1 vol %. In the usual method, the process is performed with an activation gas having a water vapor content of from 40 to 60 vol % or often a higher content. This is because the composition of the activation gas is set so as to have a partial pressure of water vapor as high as possible since the activation rate of the carbonized material of the carbonaceous raw material is significantly faster by water vapor than that by carbon dioxide. The above composition of the activation gas enables activation under mild conditions with a significantly slower activation rate, as compared with the usual method.

The conditions for activation can be suitably adjusted depending on composition of the activation gas, desired specific surface area, pore distribution, etc. For example, the activation temperature may be from 600 to 1200° C., preferably from 700 to 1100° C., and more preferably from 750 to 1000° C. The activation time may be from 0.1 to 10 hours, preferably from 0.5 to 7 hours, and more preferably from 1 to 5 hours.

After activation, the activated material may be cooled to a temperature of 300° C. or lower (preferably 200° C. or lower) in a gas having a same composition as a gas for activation and then be taken out of the system and further adjusted to have the specific surface area and/or pore distribution. For example, the material may be heat-treated in inert gas. The heat treatment can reduce the pore size of the activated carbon in an action of compacting the carbonaceous structure by baking procedure, i.e., by a so-called sintering effect. To achieve such a sintering effect, the heat treatment temperature may be from 500 to 1000° C., preferably from 500 to 950° C., and more preferably from 500 to 900° C. The heat treatment period varies depending on the heat treatment temperature. For example, if the heat treatment temperature is 500° C., the heat treatment period may be preferably from about 20 to 180 minutes. If the heat treatment temperature is 800° C., the heat treatment period may be preferably from about 5 to 60 minutes.

Besides a process for adjusting the specific surface area and pore distribution by lowering the water vapor content in the activation gas, such adjustment of the specific surface area and pore distribution can be achieved by activating the carbonized material of the carbonaceous raw material by the usual method and then performing the above heat treatment. For example, activated carbon obtained by the usual method may be subjected to further heat treatment at a temperature of 500° C. or higher in a gas substantially free of oxygen and/or water vapor and then to cooling treatment to a temperature of 300° C. or lower in the same gas as in the heat treatment to produce a specific activated carbon having an adjusted specific surface area and adjusted pore distribution. The gas substantially free of oxygen and/or water vapor may be nitrogen, carbon dioxide, or a mixture of these gases. Such a gas may be a gaseous atmosphere which does not generate oxygen-bonded surface on the activated carbon surface, so that in the context thereof the gas may contain not higher than 1 to 2 vol % of oxygen and water vapor. These conditions of heat treatment temperature and period as described above make it possible to achieve the sintering effect. Further, the heat treatment under an atmosphere having a specific composition can prevent the activated carbon from weight loss caused by oxidation of the carbonaceous surface, so as to achieve pore size reduction. As used herein, the "activated carbon obtained by the usual method" means activated carbon obtained by the conventional production method which includes activating the material in an activation gas having a water vapor content higher than 40 vol % and taking out the material from the activation furnace to bring it into contact with air before the material is sufficiently cooled after activation.

Activated carbon obtained under the above-described conditions has a specific large surface area and has a structure in which pores each having a small pore radius are highly developed. It is considered that such an activated carbon can exhibit high mercury adsorption performance thanks to such a specific volume of small pores. To further increase the volume of pores each having a pore radius of 8 Å or smaller, it is preferable to adjust the water vapor content in the activation gas to 15 vol % or lower to further increase the activation degree while suppressing decrease in the proportion of the volume of the pores each having a pore radius of 8 Å or smaller.

The advantageous effects can be obtained regardless of the form of activated carbon such as crushed charcoal, pelletized charcoal, and granulated charcoal (granular charcoal). In terms of pressure loss, adsorption capacity, and ease of handling such as replacement, it is preferable to use granular charcoal or pelletized charcoal. For example, pelletized charcoal can be prepared by adding 30 to 60 parts of petroleum pitch, coal tar, or a polymer as a binder to 100 parts of carbon material, mixing and forming the materials, and then activating the mixture according to the usual method.

The resulting activated carbon has a specific surface area of 1000 m$^2$/g or larger and a volume of micropores of 80 cm$^3$/g or larger, each of the micropores having a pore radius of 8 Å or smaller. The specific surface area and the volume of micropores each having a pore radius of 8 Å or smaller may be adjusted within their preferable ranges as described above.

In the method of producing the mercury adsorbent according to the present invention, in terms of adjustment to a specific moisture content, it is preferable to use an activated carbon having a weight ratio of oxygen content to carbon content O/C of from 0.010 to 0.100, more preferably from 0.015 to 0.080, further preferably from 0.020 to 0.050, and still more preferably from 0.030 to 0.045.

In the present invention, as a method for allowing an activated carbon to carry a mineral acid, there may be mentioned a method in which a mineral acid solution can be brought into contact with the activated carbon. As a method of bringing a mineral acid solution into contact with an activated carbon, the activated carbon can be immersed in or impregnated with the mineral acid solution, alternatively the mineral acid solution can be showered or sprayed onto the activated carbon. It is preferable to impregnate the activated carbon with a mineral acid solution in order to prepare a mineral acid-supported activated carbon. For example, the mineral acid-supported activated carbon can be prepared by impregnating an activated carbon with a mineral acid solution so as for the activated carbon to adsorb the mineral acid in the pores thereof, followed by washing the activated carbon with water or an organic solvent to remove excess mineral acid from the activated carbon. Various mineral acids as mentioned above can be used as the mineral acid. It is preferable to use at least one acid selected from the group consisting of hydrochloric acid, sulfuric acid, and phosphoric acid. The concentration of the mineral acid solution is not limited to a specific value and may suitably be from 0.1 to 3 N (normality). Application of the mineral acid in the form of an aqueous solution makes it possible to adjust the moisture content of the mercury adsorbent during drying process as described later.

In the present invention, the treating temperature adopted for the activated carbon to carry the mineral acid is not limited to a specific temperature, and may be from 5 to 80° C. Where a mineral acid solution is used, the temperature of the mineral acid solution is preferably from 20 to 80° C. A too low temperature is not preferable because water is slowly diffused into the pores of the activated carbon, which may cause difference in homogeneity of the mineral acid, even if slow diffusion is advantageous for adsorption of the mineral acid. A too high temperature is not preferable because there is a possibility that the amount of the mineral acid to be carried on the surface of the activated carbon may be reduced due to increase in vapor pressure of water, although water is quickly diffused into the pores of the activated carbon.

In the present invention, the treating time for the activated carbon to carry the mineral acid is not limited to a specific one because it is rather affected by the concentration of the mineral acid solution and the carrying temperature depending on the method of impregnation and the like. In terms of sufficient adsorption and carrying, the treating time may be from 0.1 to 10 hours, preferably from 0.2 to 6 hours, and more preferably from 0.5 to 3 hours. A too long impregnation time is economically impractical since the apparatus is occupied for a long time, while a too short impregnation time tends to result in insufficient diffusion of the mineral acid into the pores.

The mineral acid-supported activated carbon is preferably washed with water and/or an organic solvent to remove excess unadsorbed mineral acid. The presence of an unadsorbed mineral acid is undesirable because the mineral acid may leach into a liquid hydrocarbon, possibly resulting in catalyst poisoning and/or corrosion due to amalgam formation in subsequent petrochemical processes, etc. Washing can be performed, for example, by filtering and washing the activated carbon with water and/or an organic solvent or by immersing the activated carbon in water and/or an organic solvent followed by gently stirring. Depending on the type of mineral acid to be supported, for example, washing can be performed until the pH of the solution used for washing reaches 5 to 7. Examples of organic solvents may include: hydrocarbons such as hexane, heptane, octane, cyclohexane, and toluene; alcohols such as methanol, ethanol, propanol, isopropanol, and butanol; cyclic ethers such as tetrahydrofuran, tetrahydropyran, and 1,4-dioxane; lactones such as butyrolactone and pyrone; dimethyl sulfoxide; sulfolane; petroleum ether; and petroleum naphtha (light naphtha and heavy naphtha).

In the present invention, washing may be performed in multiple stages in terms of moisture content control. For example, where washing is performed in two stages, the first washing may be performed with water followed by drying, and then the second washing may be performed with an organic solvent. By performing the second washing with an organic solvent, it is possible to remove excess water remaining after drying, making it easier to adjust the moisture content of the activated carbon to 0.1 to 3 wt %.

Adjustment of a moisture content of an acid-treated activated carbon to a specific value may be performed by: adding the above-mentioned mineral acid in the form of an aqueous solution to an activated carbon and adjusting the moisture content of the acid-treated activated carbon during drying; or adding a predetermined amount of water to the acid-treated activated carbon after drying to adjust the moisture content. In terms of attaining a uniform dry state, it is preferable to impregnate the activated carbon with the mineral acid solution, and then dehydrate and dry the acid-treated activated carbon to adjust the moisture content to 0.1 to 3 wt %. The method of drying is not limited to a specific one. The acid-treated activated carbon may be dried by heating, pressure reduction, or a combination of these methods. The drying temperature may vary depending on the form of the activated carbon and the like. Considering condensation of the mineral acid which evaporates simultaneously, the drying temperature may be from 80 to 200° C., more preferably from 100 to 160° C., and further preferably 120 to 150° C. The pressure may be from 14 Torr to atmospheric pressure (760 Torr), more preferably from 140 Torr to atmospheric pressure, and further preferably 200 Torr to atmospheric pressure.

The drying time in the present invention cannot be specified in a definite way because it is affected by the conditions such as drying temperature. For example, where drying is performed under atmospheric pressure, the drying time may be from 1 to 60 hours. In terms of economic efficiency and suppression of variation among products, the drying time may be from 3 to 40 hours and more preferably from 5 to 20 hours.

In the present invention, in terms of moisture content control, drying may be performed in multiple stages. For example, where drying is performed in two stages, after a first drying, another washing may be performed as described above, and then a second drying may be performed. In this case, the drying temperature during the first drying may be from 115 to 200° C. and preferably from 120 to 160° C. The drying temperature during the second drying may be adjusted depending on the type of washing solution after the first drying and may be from 80 to 105° C. and preferably from 80 to 100° C.

The atmosphere under which carrying of the mineral acid and drying are performed is not limited to a specific atmosphere. These processes can be performed in the atmosphere or an inert gas such as nitrogen and argon.

The thus-obtained mercury adsorbent is not limited in terms of storage method. The mercury adsorbent may be preferably stored in a humidity-controlled environment or be stored in a normal environment since the mercury adsorbent does not have a particularly high moisture absorbance.

Method of Using Mercury Adsorbent/Method of Removing Mercury and/or Mercury Compound The mercury adsorbent according to the present invention can be used in various forms as long as it can be used for a liquid hydrocarbon. It is preferable to use the mercury adsorbent in the form of a fixed bed packed in an adsorption tower to remove mercury and/or a mercury compound contained in a liquid hydrocarbon while avoiding crush of the activated carbon due to agitation in a case of adsorption in a medium having a large difference in specific gravities from the mercury adsorbent.

The particle size of the mercury adsorbent according to the present invention can be suitably adjusted depending on the form of use. Where the mercury adsorbent is used in the form of a fixed bed packed in an adsorption tower, the particle size may be preferably from 4.75 to 0.15 mm, and more preferably from 1.70 to 0.50 mm. In the present invention, the particle size of the mercury adsorbent indicates the particle size determined by sieving.

The mercury adsorbent according to the present invention can be used in a method for removing mercury and/or a mercury compound contained in a liquid hydrocarbon. Specifically, the removal method may include bringing the mercury adsorbent according to the present invention into contact with a liquid hydrocarbon containing mercury and/or a mercury compound in a liquid phase to adsorb and remove the mercury and/or the mercury compound. As used herein, a liquid hydrocarbon refers to a wide range of a hydrocarbon compound from which a solid mercury adsorbent is used to remove mercury and/or a mercury compound through a solid-liquid contact process. The liquid hydrocarbon primarily refers to an intermediate of petrochemical or petroleum products in many cases. For example, the mercury removal method according to the present invention can also be applied to naphtha, components which are liquid at normal temperature and include hydrocarbons having about 6 to 15 carbon atoms among various intermediates of petrochemical or petroleum products, as well as liquefied petroleum and coal hydrocarbon compounds and the like.

Furthermore, hydrocarbons which are gaseous at normal temperature and pressure and mainly include hydrocarbons having 5 carbon atoms or fewer, such as natural gas, ethylene and propylene, can be processed in a pressurized and liquefied form by the mercury removal method according to the present invention. Hydrocarbon compounds solid at normal temperature and capable of liquefied by heating can be processed in a liquefied form by the mercury removal method according to the present invention.

In particular, since naphtha and liquefied olefins having 5 carbon atoms or fewer such as liquefied natural gas (LNG), liquefied petroleum gas (LPG), and liquefied ethylene, liquefied propylene are in liquid form, they can be directly brought into contact with the mercury adsorbent according to the present invention so as to make the mercury adsorbent remove mercury and/or a mercury compound from them, achieving high industrial applicability. Hydrocarbons to be treated according to the present invention can be a single component or a mixture of multiple components.

The mercury removal method according to the present invention is applicable for these liquid hydrocarbons to remove chemical components of mercury contained therein, irrespective of the form of substances containing mercury atoms such as elemental mercury, inorganic mercury and organic mercury. The concentration of a mercury targeted in the present invention to be removed from a hydrocarbon compound is not limited to a specific value. The mercury removal method according to the present invention can be applied to hydrocarbon compounds containing large amounts of mercury and/or mercury compound as well as to hydrocarbon compounds containing only small amounts of mercury and/or mercury compounds to remove the mercury and/or the mercury compound to an acceptable and extremely small concentrations. Petroleum-based liquid hydrocarbons such as naphtha, which are main targets of treatment, tend to contain a small amount of mercury and/or mercury compound, e.g., from about 0.002 to 10 mg/kg. Since the mercury removal method according to the present invention is based on adsorption, the method is suitable for the removal of impurities at small concentrations. When removing mercury and/or a mercury compound, if necessary, filtering may be performed to separate sludge and the like from a liquid hydrocarbon through a filtration membrane or a filter so as to remove a mercury compound that is filtered out with the sludge in advance.

The mercury adsorbent according to the present invention may achieve mercury adsorption of, for example, 0.75 mg/g or more, preferably 0.80 mg/g or more, and more preferably 0.90 mg/g or more when contacted with light naphtha containing mercury and/or a mercury compound in a mercury concentration of 100 μg/kg. The amount of mercury adsorption is measured by the method as described in Examples below.

EXAMPLES

Hereinafter, the present invention will be specifically described with reference to Examples. The Examples, however, are not to be construed as limiting the scope of the present invention. In the following Examples, various physical properties were measured by the following methods.

Specific Surface Area

Activated carbon before carrying an acid was subjected to vacuum degasification and then was analyzed using a nitrogen adsorption analyzer "BELSORP-MAX" manufactured by MicrotracBEL Corporation to obtain a nitrogen adsorption isotherm at 77 K. From the obtained adsorption isotherm, a specific surface area ($m^2/g$) was determined by BET method.

Pore Volume

Activated carbon before carrying an acid was subjected to vacuum degasification and then was analyzed using a nitrogen adsorption analyzer "BELSORP-MAX" manufactured by MicrotracBEL Corporation to determine nitrogen adsorption up to a relative pressure $P/P_0$ of 0.93 (wherein P denotes a gas pressure of an adsorbent in adsorption equilibrium, and $P_0$ denotes a saturation vapor pressure of an adsorbent at adsorption temperature) and obtain a nitrogen adsorption isotherm at 77 K. Pore distribution was calculated by applying NL-DFT method to the nitrogen adsorption isotherm, and then, a total pore volume ($cm^3/g$) and a pore volume ($cm^3/g$) of pores each having a pore radius 8 Å or smaller were determined.

Elemental Analysis: Carbon Content

Elemental analysis of activated carbon before carrying an acid was performed using a 2400 Series II CHNS elemental analyzer manufactured by PerkinElmer, Inc. The activated carbon was completely combusted in pure oxygen at 1800° C. and was analyzed by frontal chromatography. Three samples were analyzed for the test, and the average was used as the analysis value of carbon content.

Elemental Analysis: Oxygen Content

Based on inert gas fusion method, elemental analysis of activated carbon before carrying an acid was performed using an oxygen/nitrogen/hydrogen analyzer "EMGA-930" manufactured by HORIBA, Ltd. The oxygen detection method of this analyzer is inert gas fusion-non-dispersive infrared absorption method (NDIR). The analyzer was calibrated with a Ni capsule and SS-3 (oxygen standard samples). After pretreatment at 250° C. for about 10 minutes, 20 mg of a dry sample was collected in a Ni capsule and was degassed for 30 seconds in the analyzer before measurement. Three samples were analyzed for the test, and the average was used as the analysis value of oxygen content.

Moisture Content

Using a Karl Fischer Moisture Titrator CA-310 manufactured by Mitsubishi Chemical Analytech Co., Ltd., 1 g of an adsorbent sample was heated to 250° C., and a moisture content (wt %) of the adsorbent was measured by coulometric titration under nitrogen stream.

Ion Contents

An adsorbent sample was combusted in a trace chlorine sulfur analyzer "TOX-10Σ" manufactured by Mitsubishi Chemical Corporation to generate a gas, and the generated gas was absorbed in ion exchange water to prepare an analysis sample. Using an ion chromatograph "DX-120" manufactured by Dionex Corporation, a chlorine ion content and a phosphate ion content (in ppm) were measured with a sodium carbonate/sodium bicarbonate solution as an eluent.

Evaluation of Mercury Adsorption

An adsorbent sample was brought into contact with light naphtha (C6-C9 hydrocarbon) containing mercury and a mercury compound to determine mercury adsorption by the adsorbent. Specifically, 10 g of an adsorbent was immersed in light naphtha having a mercury concentration of 100 μg/kg, and after 2 hours of gentle stirring, the mercury concentration in the light naphtha was measured. The mercury concentration in the light naphtha was measured using a reducing vaporization atomic absorption spectrophotometer "RA3420" manufactured by Nippon Instruments Corporation, and mercury adsorption by the adsorbent was calculated by the following equation (1).

Mercury adsorption (mg/g)=(amount of mercury in light naphtha before adsorption−amount of mercury in light naphtha after adsorption)/amount of adsorbent used    (1)

Mercury adsorption performance of the adsorbent was evaluated according to the following criteria:
Excellent: 1 mg/g or more,
Good: 035 mg/g or more,
Moderate: 0.25 mg/g or more, and
Poor: less than 0.25 mg/g.

Corrosive Appearance Test

An adsorbent sample (20 g) was taken in a glass petri dish, and a test piece made of SS300 and having a size of 20 mm×20 mm×2 mm was embedded in the adsorbent sample before placing a glass lid on the petri dish. In this state, the sample was left to stand at room temperature for 7 days. After 7 days, the test piece was taken out for appearance evaluation according to the following criteria:
Excellent: no change,
Good: slightly cloudy,
Moderate: cloudy on all over the surface, and
Poor: with dot-like corrosion marks.

Reference Example 1

A carbonized material prepared by dry distillation of coconut shells was crushed to 4- to 10-mesh (particle size of 1.7 mm or larger and 4.75 mm or smaller) to obtain raw material for granular activated carbon. This carbonized raw material was activated at 870° C. for 2 hours with combustion gas of liquefied petroleum gas (gas composition (vol %): nitrogen gas 70%, oxygen gas 0.2%, carbon dioxide gas 19.8%, and water vapor 10%) and was then cooled to a temperature of 200° C. or lower in the gas having the same composition. The thus-obtained activated carbon was crushed to obtain 10- to 32-mesh granular activated carbon (particle size of 0.5 mm or larger and 1.7 mm or smaller). The obtained activated carbon had an ash content (ignition residue) of 2.5 wt %. The obtained activated carbon had a specific surface area of 1490 $m^2/g$, a total pore volume of 279 $cm^3/g$, a volume of pores each having a pore radius of 8 Å or smaller of 120 $cm^3/g$, an oxygen content of 3.2 wt %, and a carbon content of 94.1 wt %.

Reference Example 2

Granular activated carbon was obtained in the same manner as Reference Example 1, except that the composition of the gas used for the activation of the carbonized raw material was changed to nitrogen gas 50%, oxygen gas 0.2%, carbon dioxide gas 19.8%, and water vapor 30%. The obtained activated carbon had a specific surface area of 1570 $m^2/g$, a total pore volume of 291 $cm^3/g$, a volume of pores each having a pore radius of 8 Å or smaller of 107 $cm^3/g$, an oxygen content of 2.94 wt %, and a carbon content of 94.7 wt %.

Reference Example 3

Granular activated carbon was obtained in the same manner as Reference Example 1, except that the composition of the gas used for the activation of the carbonized raw material was changed to nitrogen gas 25%, oxygen gas 0.2%, carbon dioxide gas 19.8%, and water vapor 55%. The obtained activated carbon had a specific surface area of 1610 $m^2/g$, a total pore volume of 302 $cm^3/g$, a volume of pores each having a pore radius of 8 Å or smaller of 48 $cm^3/g$, an oxygen content of 2.56 wt %, and a carbon content of 94.9 wt %.

Reference Example 4

Granular activated carbon obtained according to Reference Example 1 was heated again at a temperature of 800° C. for 1.5 hours under nitrogen to obtain granular activated carbon. The obtained activated carbon had a specific surface area of 1350 $m^2/g$, a total pore volume of 244 $cm^3/g$, a volume of pores each having a pore radius of 8 Å or smaller of 72 $cm^3/g$, an oxygen content of 1.69 wt %, and a carbon content of 93.8 wt %.

TABLE 1

| | Specific surface area m²/g | Total pore volume cm³/g | Volume of pores each having pore radius of 8 Å or smaller cm³/g | Oxygen/carbon ratio — |
|---|---|---|---|---|
| Ref. Ex. 1 | 1490 | 279 | 120 | 0.034 |
| Ref. Ex. 2 | 1570 | 291 | 107 | 0.031 |
| Ref. Ex. 3 | 1610 | 302 | 48 | 0.027 |
| Ref. Ex. 4 | 1350 | 244 | 72 | 0.018 |

Example 1

The activated carbon (100 g) obtained according to Reference Example 1 was immersed in 1 L of 1 N hydrochloric acid at a temperature of 25° C. for 1.5 hours to adsorb hydrochloric acid. Then, the activated carbon was filtered and washed with 5 L of distilled water until pH of the washing water reached 6, followed by drying at a temperature of 120° C. for 10 hours in the atmosphere. The activated carbon was further washed with 1 L of light naphtha (C6-C9 hydrocarbon) and dried again at a temperature of 90° C. for 10 hours in the atmosphere to give an adsorbent. Table 2 shows the measurement results of the moisture content and chlorine content of the obtained adsorbent, as well as the results of mercury adsorption evaluation and corrosive appearance test for the obtained adsorbent.

Example 2

An adsorbent was prepared in the same manner as Example 1, except that the activated carbon obtained according to Reference Example 2 was used. Table 2 shows the various evaluation results.

Example 3

An adsorbent was prepared in the same manner as Example 1, except that the supported acid was changed from hydrochloric acid to phosphoric acid. Table 2 shows the various evaluation results.

Example 4

An adsorbent was prepared in the same manner as Example 1, except that the drying time for drying after washing with distilled water and before washing with light naphtha was changed to 4 hours. Table 2 shows the various evaluation results.

Comparative Example 1

An adsorbent was prepared in the same manner as Example 1, except that the activated carbon obtained according to Reference Example 3 was used. Table 2 shows the various evaluation results.

Comparative Example 2

An adsorbent was prepared in the same manner as Example 1, except that the drying temperature for drying after washing with distilled water and before washing with light naphtha was changed to 110° C., and that the drying time was changed to 12 hours. Table 2 shows the various evaluation results.

Comparative Example 3

An adsorbent was prepared in the same manner as Example 1, except that no acid was affixed. Table 2 shows the various evaluation results.

Comparative Example 4

An adsorbent was prepared in the same manner as Example 1, except that the activated carbon obtained according to Reference Example 4 was used. Table 2 shows the various evaluation results.

TABLE 2

| | Activated carbon | Affixed acid | Combustion detection | | Moisture content wt % | Mercury adsorption performance | | Corrosive appearance |
|---|---|---|---|---|---|---|---|---|
| | | | Ion species | Content (ppm) | | Adsorption (mg/g) | Performance evaluation | |
| Ex. 1 | Ref. Ex. 1 | HCl | Cl⁻ | 2750 | 1.8 | 1.01 | Excellent | Excellent |
| Ex. 2 | Ref. Ex. 2 | HCl | Cl⁻ | 2330 | 0.9 | 0.98 | Good | Excellent |
| Ex. 3 | Ref. Ex. 1 | $H_3PO_4$ | $PO_4^{3-}$ | 3020 | 1.9 | 0.92 | Good | Excellent |
| Ex. 4 | Ref. Ex. 1 | HCl | Cl⁻ | 2770 | 2.8 | 1.09 | Excellent | Excellent |
| Com. Ex. 1 | Ref. Ex. 3 | HCl | Cl⁻ | 2200 | 0.4 | 0.31 | Moderate | Good |
| Com. Ex. 2 | Ref. Ex. 1 | HCl | Cl⁻ | 5100 | 3.5 | 0.95 | Good | Moderate |
| Com. Ex. 3 | Ref. Ex. 1 | None | — | — | 2.1 | 0.14 | Poor | Excellent |
| Com. Ex. 4 | Ref. Ex. 4 | HCl | Cl⁻ | 1860 | 0.8 | 0.55 | Moderate | Poor |

As shown in Table 2, each of the adsorbents of Examples 1, 2, and 4 has an adjusted moisture content within a specific range while comprising a hydrochloric acid-supported activated carbon having a specific surface area and a volume of pores each having a pore radius of 8 Å or smaller within specific ranges, so that the adsorbents have extremely excellent adsorption properties even for a trace amount of mercury and mercury compound contained in light naphtha and furthermore the adsorbents are excellent in stability for long-term use in that they can suppress corrosion of steel materials. No organic mercury was detected in the light naphtha after the adsorption test, indicating adsorption of all of them by the adsorbents.

The adsorbent of Example 3, which contains the activated carbon supporting phosphoric acid as the mineral acid, has extremely excellent adsorption properties for mercury and a mercury compound and excellent stability for long-term use as with the adsorbent of Example 1 which contains the activated carbon supporting hydrochloric acid.

On the other hand, since each of the adsorbents of Comparative Examples 1 and 4 contains the activated carbon having a small volume of pores each having a pore radius of 8 Å or smaller, the adsorbents have inferior adsorption properties for mercury and a mercury compound to the adsorbents of Examples 1, 2, and 4. In addition, presumably because the adsorbent of Comparative Example 4 has a relatively low oxygen content and thus cannot hold water, leading to steel material corrosion so that the adsorbent cannot be considered as suitable for practical use.

The adsorbent in Comparative Example 2 has excellent adsorption properties for mercury and a mercury compound, but the adsorbent cannot suppress corrosion of a steel material because the moisture content of the adsorbent is not successfully adjusted within a specific range, so that the adsorbent is not adequate for long-term use.

The adsorbent of Comparative Example 3 does not contain an acid-supported activated carbon and thus does not have sufficient adsorption properties for mercury and a mercury compound.

INDUSTRIAL APPLICABILITY

The mercury adsorbent according to the present invention is useful for removing mercury and/or a mercury compound contained in hydrocarbons such as naphtha and various other intermediates of petrochemical or petroleum products.

Although the present invention has been described in terms of the preferred embodiments, those skilled in the art would readily arrive at various changes and modifications in view of the present specification without departing from the scope of the invention. Accordingly, such changes and modifications are included within the scope of the present invention defined by the appended claims.

What is claimed is:

1. A mercury adsorbent for adsorbing mercury and/or a mercury compound in a liquid hydrocarbon, the mercury adsorbent comprising:
   an activated carbon including a mineral acid supported thereon,
   wherein
   the activated carbon has a specific surface area of 1000 $m^2/g$ or larger and a volume of micropores of 80 $cm^3/g$ or larger,
   each of the micropores has a pore radius of 0.8 nm or smaller, and
   the mercury adsorbent has a moisture content of from 0.1 to 3 wt %.

2. The mercury adsorbent of claim 1, wherein the activated carbon contains oxygen and carbon in a weight ratio (O/C) of from 0.010 to 0.100.

3. The mercury adsorbent of claim 1, wherein when measured by a combustion ion chromatography method, at least one ion selected from the group consisting of a chloride ion, a bromide ion, a phosphate ion, a phosphite ion, a sulfate ion, and a sulfite ion is detected in an amount of from 1000 to 5000 ppm.

4. The mercury adsorbent of claim 1, wherein the mineral acid is at least one acid selected from the group consisting of hydrochloric acid, sulfuric acid, and phosphoric acid.

5. A method of producing the mercury adsorbent as of claim 1, the method comprising:
   bringing a mineral acid solution into contact with an activated carbon having a specific surface area of 1000 $m^2/g$ or larger and a volume of micropores of 80 $cm^3/g$ or larger, each of the micropores having a pore radius of 0.8 nm or smaller, to obtain an acid-treated activated carbon; and
   adjusting a moisture content of the acid-treated activated carbon within a range of from 0.1 to 3 wt %.

6. The method of claim 5, wherein the activated carbon contains oxygen and carbon in a weight ratio (O/C) of from 0.010 to 0.100.

7. A method for adsorbing mercury and/or a mercury compound, the method comprising:
   bringing the mercury adsorbent of claim 1 into contact with a liquid hydrocarbon containing the mercury and/or the mercury compound.

* * * * *